United States Patent
Mizukami

[11] Patent Number: 6,106,400
[45] Date of Patent: Aug. 22, 2000

[54] SUPPORT MEMBER FOR SUPPORTING ENDS OF ELASTIC MEMBERS IN A DAMPER MECHANISM

[75] Inventor: Hiroshi Mizukami, Neyagawa, Japan

[73] Assignee: Exedy Corporation, Osaka, Japan

[21] Appl. No.: 09/080,193

[22] Filed: May 18, 1998

[30] Foreign Application Priority Data

May 20, 1997 [JP] Japan ................................ 9-129979

[51] Int. Cl.[7] .................................................... F16D 3/12
[52] U.S. Cl. ............................................ 464/67; 464/62
[58] Field of Search ............................ 464/67, 66, 62, 464/63, 64; 192/3.28; 267/179

[56] References Cited

U.S. PATENT DOCUMENTS

| 937,291 | 10/1909 | Eaton .................................. 464/66 X |
| 4,347,717 | 9/1982 | Lamarche ................................ 464/64 |
| 5,052,664 | 10/1991 | Lesher et al. ........................ 464/67 X |
| 5,175,913 | 1/1993 | Mackie et al. ............................ 24/562 |
| 5,984,065 | 11/1999 | Teramae et al. ....................... 192/3.28 |
| 6,035,993 | 3/2000 | Gochenour ............................. 464/63 X |

*Primary Examiner*—Lynne H. Browne
*Assistant Examiner*—Greg Binda
*Attorney, Agent, or Firm*—Shinjyu Global IP Counselors, LLP

[57] ABSTRACT

A lockup damper has a drive plate, a driven plate, first and second coil springs, an intermediate plate and a support clip (40). The lockup damper dampens and absorbs vibrations transmitted to a turbine from a front cover. The first and second coil springs are disposed between the drive plate and the driven plate. The plate-shaped intermediate member has an intermediate support portion (21) disposed between the first and second coil springs. The support clip (40) has a pincher portion and first and second support portions (42) and (43). The pincher portion has a generally U-shape that wraps around a portion of the intermediate support portion, engages and holds the intermediate plate in the direction of the thickness of the intermediate plate. The first support portion (42) supports the end of the first coil spring (7) in the circumferential direction.

8 Claims, 8 Drawing Sheets

SUPPORT MEMBER FOR SUPPORTING ENDS OF ELASTIC MEMBERS IN A DAMPER MECHANISM

BACKGROUND OF THE INVENTION

A. Field of the Invention

The present invention is related to a damper assembly that dampens and absorbs vibrations while transmitting torque from an input rotor to an output rotor and in particular, to a damper assembly having a plate-shaped intermediate member disposed between two or more elastic members.

B. Description of the Related Art

Ordinarily, a damper assembly dampens and absorbs vibrations transmitted to an output rotor from an input rotor while transmitting torque from the input rotor to the output rotor. A damper (hereinafter referred to as a lockup damper) that includes a lockup mechanism disposed inside a torque converter is an example of this type of damper assembly.

A torque converter is a mechanism having three types of impellers (impeller, turbine, and stator) housed internally and uses hydraulic fluid (also contained internally) to transfer torque. The impeller is secured to a front cover into which torque is inputted. Fluid moving from the impeller moves toward the turbine thereby transferring torque to the turbine from the impeller. The turbine is connected to a main drive shaft of a transmission.

The lockup mechanism is disposed between the front cover (input rotor) and the turbine (output rotor) and is a device that mechanically couples the front cover and the turbine to directly transmit torque bypassing the hydraulic fluid.

Normally, the lockup mechanism includes a piston member that can be selectively engaged with the front cover in response to fluid pressure changes inside portions of the torque converter. A drive member is secured to the piston member. A coil spring is supported on the drive member, and a driven member is elastically coupled to the piston member in the direction of rotation by means of the coil spring. The driven member is secured to the turbine. The members that constitute the lockup mechanisms are lockup dampers that absorb and dampen the vibrations transmitted to the torque converter, and in particular, the lockup dampers absorb vibration when the lockup clutch is engaged.

When the lockup mechanism operates, the piston member slides on or is pressed against the front cover. The torque is then transmitted from the front cover to the piston member and then is further transferred to the turbine through the coil spring. At this time, the lockup mechanism transmits torque together with absorbing and dampening twisting vibrations caused by the engagement and movement of portions of the lockup damper. Hereupon, by means of repeatedly compressing the coil spring between the drive member and the driven member, twisting vibrations are absorbed and dampened.

Recently, there have been many configurations in which a lockup damper disposed at an outer radial portion within a torque converter. Such a lockup damper includes a coil spring. The outer radial portion of the torque converter is a desirable location for such a damper because a comparatively large clearance results such that the overall dimensions in the axial direction of the torque converter can be reduced. However, if the coil spring is disposed at the outer radial portion of the torque converter, the total displacement angle of the lockup damper is smaller when compared with damper mechanisms that have a coil spring disposed in a radial intermediate portion within the torque converter. Namely, if a coil spring with the same dimensions is simply moved to the outer radial portion, the angle of relative rotary displacement between the input rotor and the output rotor can rotate becomes smaller because of the increased distance away from the center of the relatively rotating members of the lockup damper. As a result, the total relative rotary displacement is reduced narrowing and reducing the dampening characteristics of the lockup damper thus reducing the vibration absorption properties of the damper mechanism in a low revolution region (low RPM) of an engine.

As a method to eliminate this dis-advantage, arranging two or more coil springs in series through an intermediate member is considered. In other words, coupling two or more coil springs in series by providing an intermediate member that has a portion that supports the ends of the coil springs. By means of this, the dimensions of the coil springs coupled in series that can be compressed increases thereby making it possible to ensure a relatively large relative rotary displacement angle. Further, if two coil springs with different spring constants are combined in series, it becomes possible to improve the twisting characteristics of the lockup damper by means of having two characteristic levels.

Figure 6:
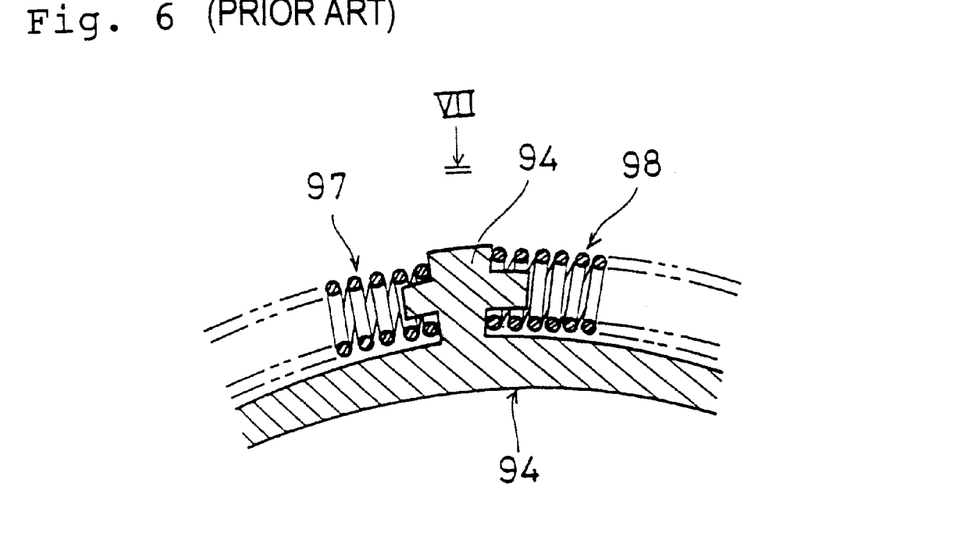
FIG. 6 is a fragmentary cross-sectional view of a portion of a lockup mechanism of a torque converter where a plate member is used between adjacent coil springs.
Figure 7:
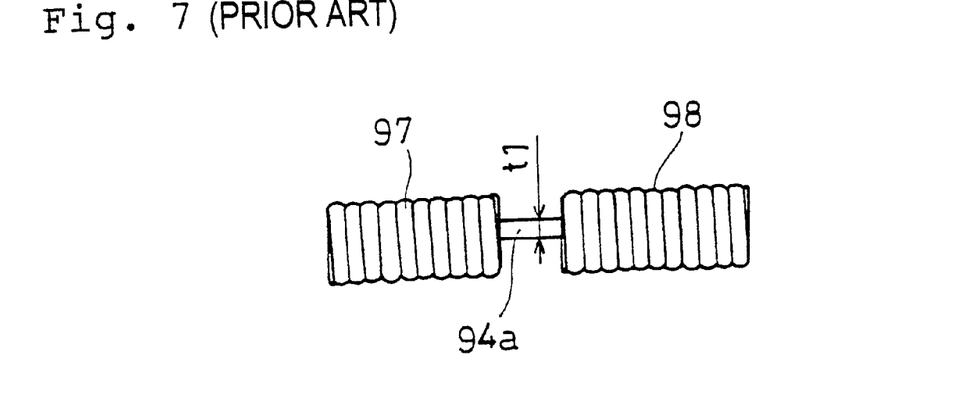
FIG. 7 is a fragmentary elevational view showing the portion of the lockup mechanism depicted in FIG. 7, looking in the direction of the arrow VII in FIG. 6.

However, in order to use two springs in series with an intermediate member, it becomes necessary to increase the size of the lockup damper and complicate the shape of other elated elements in order to avoid interference between the various elements of the lockup damper and the torque converter. In an effort to control undesirable condition associated with the use of two springs, an intermediate member has been proposed that is made from a plate material with a small plate thickness in comparison to the diameter of the coil spring, as shown by the intermediate member 94 in FIG. 6 and FIG. 7.

Figure 8:
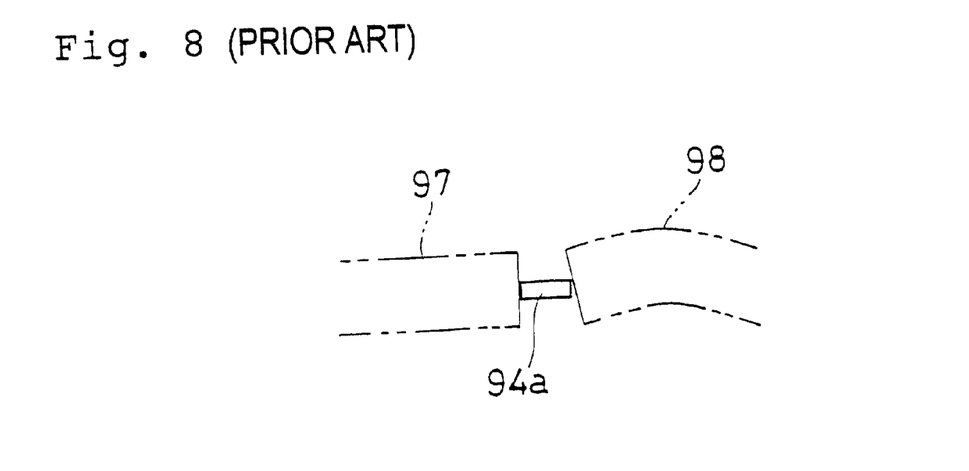
FIG. 8 is a schematic diagram of a coil spring of the lockup mechanism depicted in FIGS. 6 and 7, where one of the coil springs has moved out of alignment and is no longer in a desirable position.

However, the intermediate member 94 functions to support the end of both coil springs 97 and 98. The contact surface area between the plate material with a plate thickness (t1) of this supporting portion 94a and the end s of the coil springs 97 and 98 becomes smaller making it difficult to provide a stable support because of problems which include precision of the dimensions. In other words, if the balance of the support of the ends of the coil springs 97 and 98 is lowered due to the thickness (t1) of the plate material only, a state will occur in which rotation of the ends of the coil springs 97 and 98 will be allowed and as shown in FIG. 8 for example, there is a possibility that the coil spring 98 may bend when the coil string 98 is compressed. Because of this, the design had to take into account compression buckling of the coil springs causing deviations in the damper characteristics and the action of excessive stress on the coil springs. Moreover, if the coil springs are in a bent state, sliding will occur between the coil springs and other members which also creates the danger of degenerating damper characteristics.

SUMMARY OF THE INVENTION

The object of the present invention is to provide stable support of the ends of the elastic members in a damper assembly having elastic members disposed in series through a plate-shaped intermediate member to control undesirable position changes of the elastic members as well as improve the length of useful life of the elastic member and worsening of the damper characteristics.

In accordance with one aspect of the present invention, a damper assembly dampens and absorbs vibrations transferred from an input member to an output member. The damper assembly includes first and second elastic members in series, an intermediate member and an auxiliary support member. The intermediate member is a plate-shaped member and has an intermediate support portion. The intermediate support portion is a plate shape nd is disposed between the first elastic member and the second elastic member. The side edge surface of the intermediate member contact and support corresponding ends of the first and second elastic members in the circumferential direction. The auxiliary support member has a pincher portion, a first support portion, and a second support portion. The pincher portion contacts the intermediate member in the direction of the thickness of the intermediate member. The first support portion engages on end of the first elastic member in the circumferential direction. The second support portion engages a corresponding end of the second elastic member in the circumferential direction.

If twisting vibrations from the input member are input to the damper assembly, the input member and the output member rotate relative to each other and the first elastic member and the second elastic member are compressed between both input and output members in the direction of rotation. The first and second elastic members are dispose in series through the intermediate support portion of the intermediate member. Therefore a large relative rotary displacement angle between input and output members is possible.

The transmission of power between the first elastic member and the second elastic member is made through the intermediate support portion and the auxiliary support member. The ends of the first and second elastic members are at first supported in the circumferential direction by means of the side edge surface of the intermediate support portion. However, because the contact surface area between the intermediate support portion (plate material) and the first and second elastic members is restricted by only the support of the intermediate support portion, it is difficult to stabilize the support of the ends of the first and second elastic members.

In the damper assembly, the auxiliary support member supplements the support of the ends of the first and second elastic members. In other words, between the first and second elastic members, the first elastic member is supported by the first support portion and the second elastic member is supported by the second support portion. Moreover, because the auxiliary support member grips the intermediate member by means of the pincher portion, position shifting can be controlled.

In this way, because the auxiliary support member is provided that supports the ends of the first and second elastic members in addition to the intermediate support portion of the intermediate member, the support of the first and second elastic members is stabilized making it possible to control unexpected deformations in the elastic member s which would change the damper properties as well as control excessive stress acting on the elastic members.

Preferably, there are a plurality of first and second elastic members and intermediate support portions disposed in the direction of rotation of the torque converter. Further, the intermediate member has a plate-shaped annular coupling portion that couples the intermediate support portions together.

Thereupon, the annular coupling portion restricts movement toward the outer radial direction of the intermediate support portions by means of coupling together each intermediate support portion. Because of this, movement toward the outer radial direction due to centrifugal force or similar phenomenon is restricted by the auxiliary support member that grips the intermediate support portion and the intermediate member. Therefore, shifting of the intermediate support portions and the auxiliary support member away from the ends of the first and second elastic members in the radial direction is controlled.

Preferably, the pincher portion of the auxiliary support member is formed from spring steel and has a first side portion, a second side portion and a coupling portion. The first side portion contacts one surface of the intermediate member. The second side portion is in contact with the other surface of the intermediate member. The coupling portion is curved and joins one end of the first side portion to one end of the second side portion.

Hereupon, because the first side portion and the second side portion are joined by the curved coupling portion and the pincher portion is formed from spring steel, if the first side portion and the second side portion are made to deflect away from each other, both side portions will return to their original states. By means of this type of pincher portion gripping the intermediate member, the auxiliary support member is pressed against the intermediate member through the first side portion and the second side portion. Because of this, the adhesion between the auxiliary support member and the intermediate member increases and position shifting of the auxiliary support member with respect to the end of the first and second elastic members is reduced.

Preferably, the pincher portion of the auxiliary support member is formed of synthetic resin.

Alternatively, the pincher portion of the auxiliary support member is formed from a plate metal material.

Preferably, the auxiliary support member is formed with a first side portion engaged with one surface of the intermediate member and a second side portion engaged with an opposite surface of the intermediate member. A curved coupling portion joins one end of the first side portion to one end of the second side portion.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

Figure 1:
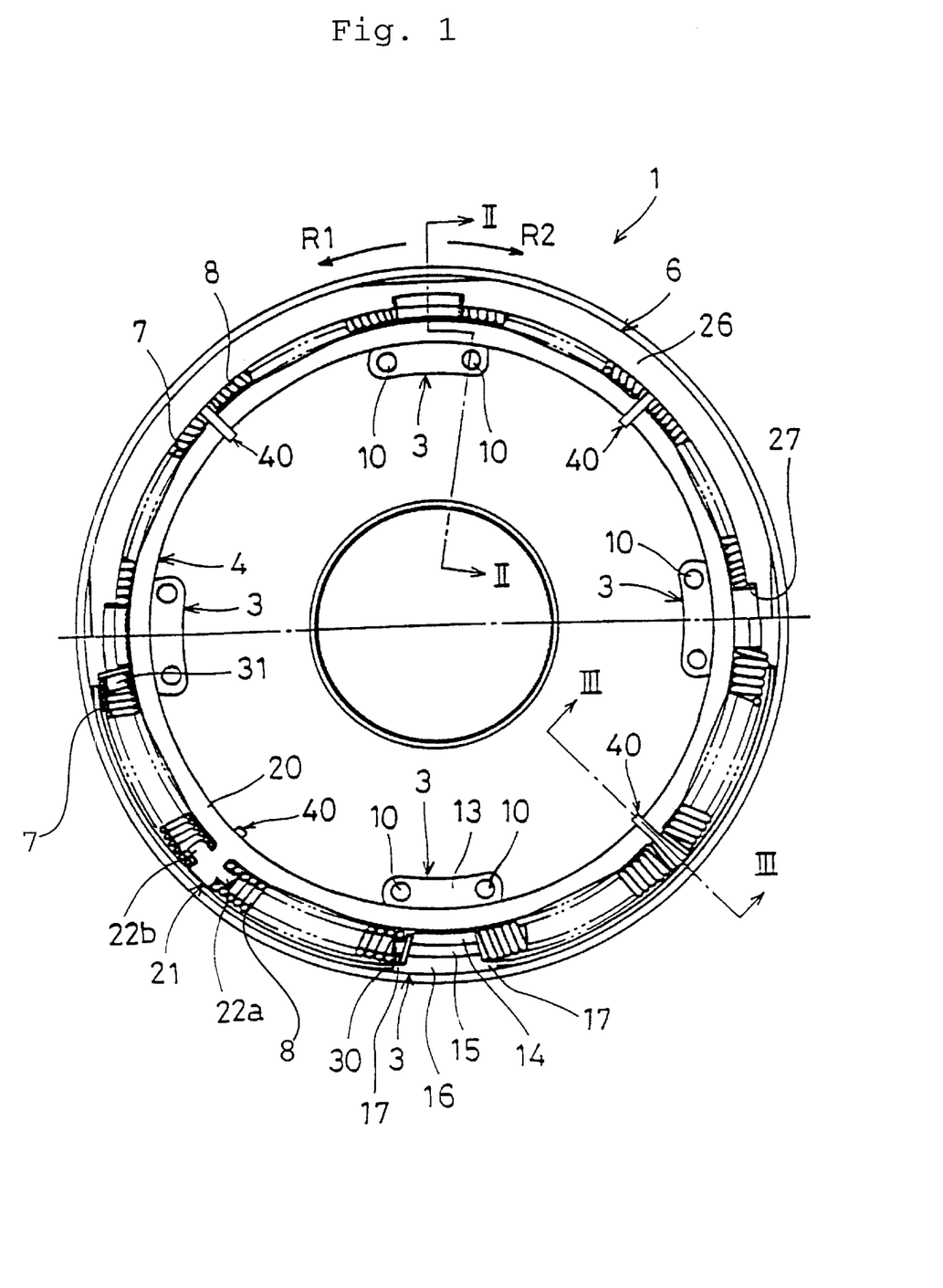
FIG. 1 is a part cross-section, part cutaway elevational view of a lockup mechanism of the torque converter, the lockup mechanism having a support clip in accordance with a first embodiment of the present invention.
Figure 2:
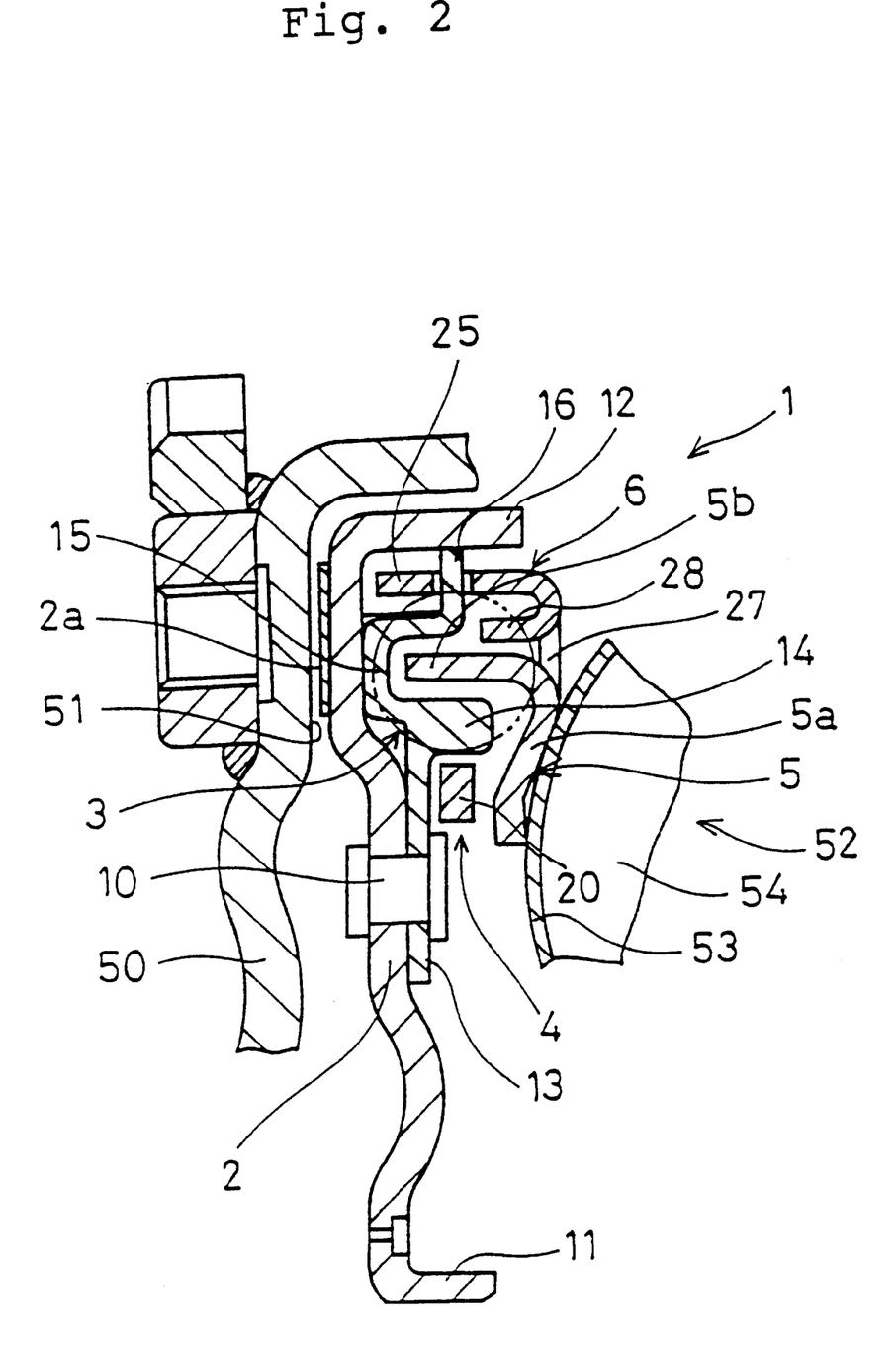
FIG. 2 is a fragmentary cross section taken along the line II—II in FIG. 1, on a slightly enlarged scale.
Figure 3:
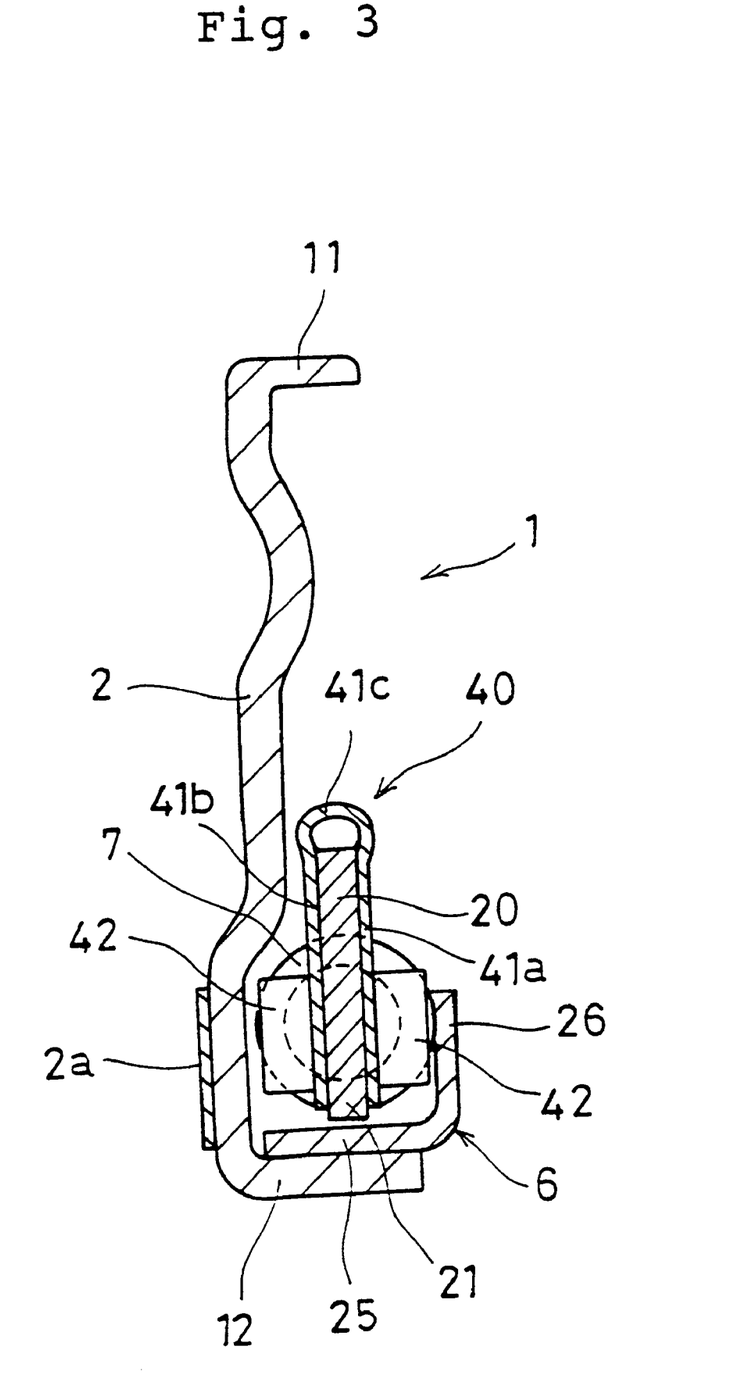
FIG. 3 is a cross section taken along the line III—III in FIG. 1, on a slightly enlarged scale.

FIG. 1 to FIG. 3 show the lockup mechanism 1 of the torque converter that includes the lockup damper that is the damper assembly in accordance with a first embodiment of the present invention. An engine (not shown) is located to a left side of FIG. 2 and FIG. 3 and a transmission (not shown) is disposed on a right side of FIG. 2 and FIG. 3. FIG. 1 is a part cross-sectional view seen from the transmission side of the lockup mechanism 1 excluding the annular portion 5a of the driven plate 5 (described below). Further, concerning the direction of rotation in FIG. 1, the direction of rotation R1 is the forward direction of rotation of the engine and the torque converter and the direction of rotation R2 is an opposite direction of rotation.

Most of the features of the torque converter are well known, and therefore a detailed description of only aspects of a torque converter relating to the present invention are provided below.

In FIG. 2, the front cover 50 (input rotor) of the torque converter and the turbine 52 (output rotor) are shown. The front cover 50 is a member coupled to the crankshaft of the engine and forms a hydraulic oil chamber of the torque converter along with an impeller (not shown). A flat, annular working surface 51 is formed on the outer peripheral side of the inner wall surface of the front cover 50. The turbine 52 is an impeller that is opposite to the impeller (not shown) in the axial direction and is principally made of a turbine shell 53 and a plurality of turbine plates 54 secured to the turbine shell 53. The inner peripheral surface of the turbine shell 53 is coupled to the main driveshaft (not shown) of the transmission through the turbine.

The lockup mechanism 1 is a mechanism that absorbs and dampens twisting vibrations inputted while mechanically transmitting torque from the front cover 50 to the turbine. Namely, the lockup mechanism 1 has a clutch function and a damper function (lockup damper). As shown in FIG. 2, the lockup mechanism 1 is disposed in what would otherwise be an empty space between the front cover 50 and the turbine 52.

The lockup mechanism 1 includes an input member and output member. The input member includes a piston 2 and a drive plate 3 that is fixed to the piston 2. The output member includes a driven plate 5 that is fixed to the turbine shell 53. The input and output members are coupled to one another by first and second coil springs 7 and 8 (first, second elastic members), an intermediate plate 4 (intermediate member) and a support clip 40 (auxiliary support member). The first and second coil springs 7 and 8, intermediate plate 4 and support clip 40 are disposed between portions of the input member and the output member, as is described in greater detail below.

The input member is made of the piston 2 and the drive plate 3.

The piston 2 is a clutch member that is moveable in an axial direction toward and away from the front cover 50 by controlling the oil pressure inside the torque converter. The piston 2 is a disk-shaped member, and has an inner peripheral protruding portion 11 and an outer peripheral protruding portion 12. The inner peripheral protruding portion 11 and the outer peripheral protruding portion 12 are cylindrical members which extend on the transmission side. The inner peripheral protruding portion 11 is supported to freely rotate relative to the outer peripheral surface of a turbine hub (not shown) as well as to be movable in the axial direction. A disk-shaped friction facing 2a is secured on the surface of the engine side of the piston 2 opposite to the working surface 51 of the front cover 50.

The drive plate 3 is secured to the piston 2 and is a member that functions to support the first and second coil springs 7 and 8 in the direction of rotation. The drive plate 3 is disposed at four locations at intervals in the direction of rotation on the outer peripheral portion (inner peripheral side of the outer peripheral protruding portion 12) on the engine side of the piston 2. As shown in FIG. 2, the drive plate 3 is made of a securing portion 13, an inner peripheral connection portion 14, a concave portion 15, and an outer peripheral connection portion 16. The securing portion 13 extends in the direction of rotation. The inner peripheral connection portion 14 extends from the outer peripheral portion of the securing portion 13 to the transmission side. The concave portion 15 extends in the outer radial direction from the inner peripheral connection portion 14 and is recessed toward the engine side. The outer peripheral connection portion 16 extends in the outer radial direction from the concave portion 15. Each of the inner peripheral connection portion 14, the concave portion 15, and the outer peripheral connection portion 16 can make contact with the inner peripheral side, the intermediate portion in the radial direction, and the outer peripheral side of first and second spring seats 30 and 31 (described below). The first and second spring seats 30 and 31 adhere to the ends of the first and the second coil springs 7 and 8. The drive plate 3 is integrally secured to the piston 2 by means of rivets 10 as shown in FIG. 2 and can function as an input member. Since the inner peripheral connection portion 14, the concave portion 15, and the outer peripheral connection portion 16 provide support at different positions on the ends of the first and the second coil springs 7 and 8, the support of the ends of the first and the second coil springs 7 and 8 is stable. The outer peripheral surface of the outer peripheral connection portion 16 makes contact with the inner peripheral surface of the outer peripheral protruding portion 12 of the piston 2. Because of this, positioning of the drive plate 3 is made easier in addition to controlling deformations in the outer radial direction of the drive plate 3. A movement restriction portion 17 that is a protrusion extending in the direction of rotation is integrally formed on both sides in the direction of rotation of the outer peripheral connection portion 16 (see FIG. 1). The movement restriction portion 17 functions to restrict movement toward the outer radial direction of both ends of the first and the second coil springs 7 and 8 by supporting the outer portion of both ends of the first and the second coil springs 7 and 8 (described below). The movement restriction portion 17 narrows the width in the radial direction following movement to a distant direction of rotation.

Figure 9:
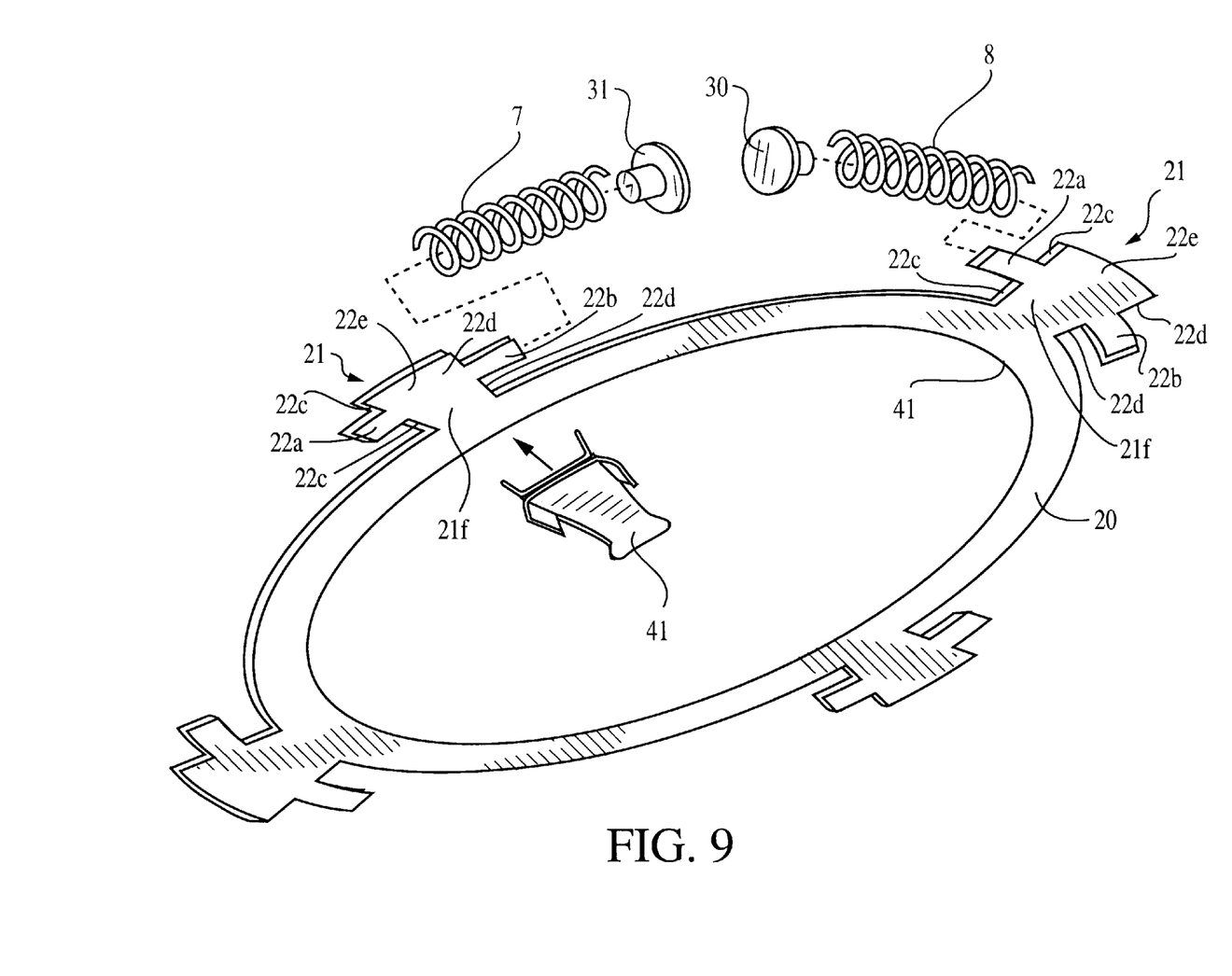
FIG. 9 is perspective exploded view showing details of the clip, a ring member of the lockup mechanism and coil springs, with the ring member, clip and coil springs removed from the lockup mechanism to provide greater clarity.
Figure 10:
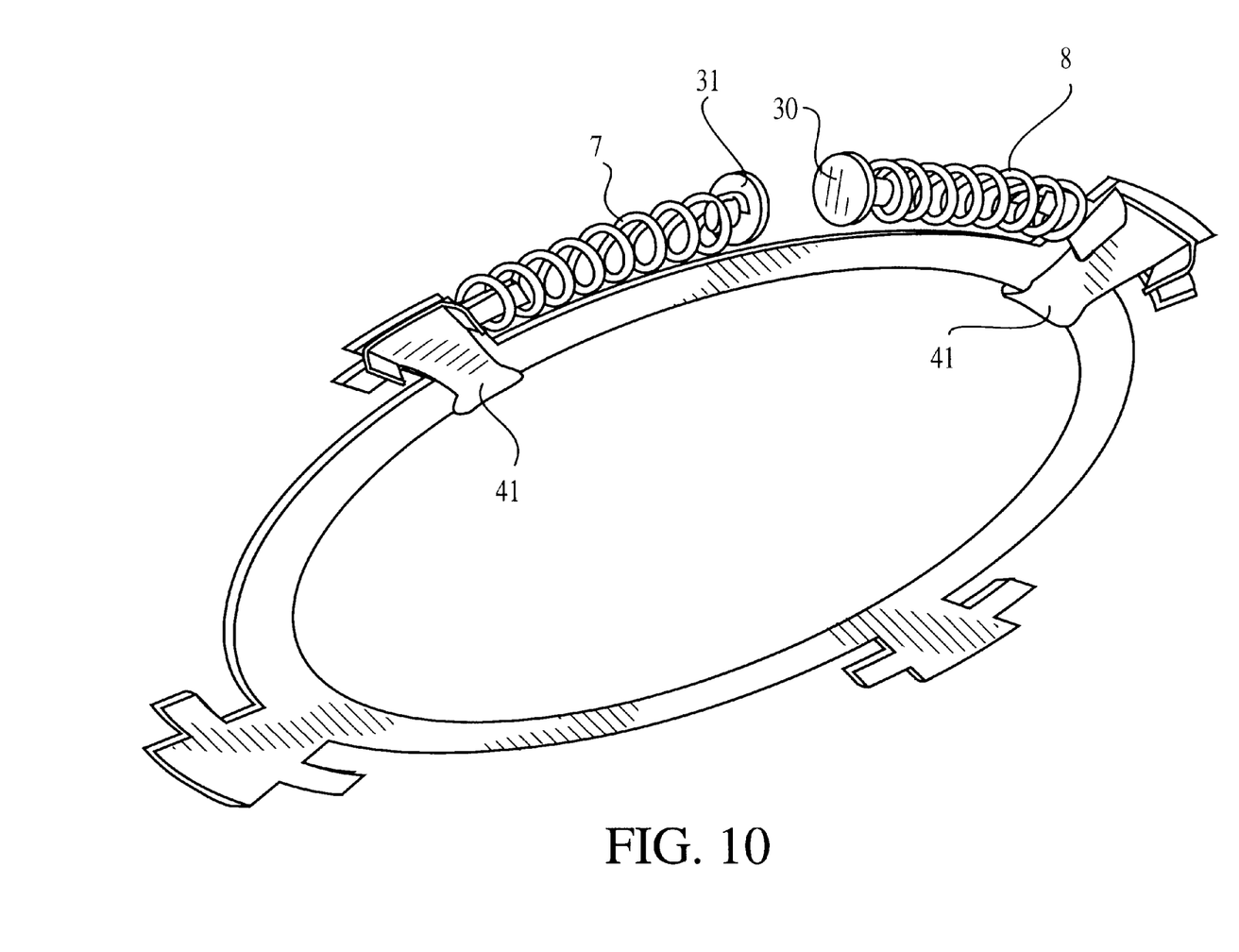
FIG. 10 is a perspective view similar to FIG. 9, showing details of the clip installed on a portion of the ring member of the lockup mechanism, with the ring member, clip and coil springs removed from the lockup mechanism to provide greater clarity.

The first and the second coil springs 7 and 8 are arranged as single groups coupled through the intermediate plate 4 and are disposed at four locations at intervals in the direction of rotation. The four groups of the first and the second coil springs 7 and 8 are arranged t operate in parallel. The first coil spring 7 harder than the second coil spring 8. Because of this, two levels of twisting characteristics are obtained in the lockup damper. Each group of the first coil spring 7 is gripped between the intermediate support portion 21 of the intermediate plate 4 and disposed in the positive direction of rotation R1 with respect to the second coil spring 8. A first spring seat 30 is disposed in the positive direction of rotation R1 of the first coil spring 7. The first spring seat 30 is made of a disk-shaped support portion and a connection portion that extends from the support portion into a portion of the coil spring, as shown in FIGS 1, 9 and 10. The rear surface of the support portion of the first spring seat 30 is supported on the inner peripheral connection portion 14 of the drive plate, the concave portion 15 and the outer peripheral connection portion 16 or on a spring contact portion 28 and a side portion 5*b* of the output member (described below). A second spring seat 31 is disposed in the negative direction of rotation R2 of the second coil spring 8. The second spring seat 31 has a composition identical to the first spring seat 30 and in like manner is supported on the inner peripheral connection portion 14 of the drive plate, the concave portion 15 and the outer peripheral connection portion 16 or on a spring contact portion 28 and a side portion 5*b* of the output member (described below).

The intermediate member 4 functions between the first coil spring 7 and the second coil spring 8 and is made of a ring (annular coupling portion) 20, the intermediate support portion 21, and first and second intermediate restriction portions 22*a* and 22*b*. Because this intermediate member 4 is formed from a thin steel plate, the ring 20 is positioned on the inner peripheral side of the first and the second coil springs 7 and 8 and the intermediate support portion 21 extends from the ring 20 between the negative direction of rotation R2 of the first coil spring 7 and the positive direction of rotation R1 of the second coil spring 8. As is clear from the figure, because the intermediate member 4 is a thin plate-shaped member, the space the lockup mechanism 1 occupies due to the employment of the intermediate member 4 and in particular, the expansion of the dimensions in the axial direction is controlled.

The intermediate support portion 21 is disposed between the negative direction of rotation R2 of the first coil spring 7 and the positive direction of rotation R1 of the second coil spring 8 making it possible to transmit torque between the first and the second coil springs 7 and 8. The intermediate support portion 21 has a triangular shape that narrows from a radially outward portion toward a radially inward portion. In other words, radially extending surfaces 22*c* and 22*d* of the intermediate support portion 21 are slanted with respect to a circumferential direction of the ring 20. The first and second intermediate restriction portions 22*a* and 22*b* extend in the circumferential direction from radially extending surfaces 22*c* and 22*d*, respectively, as shown in FIGS. 1, 9 and 10. Specifically, a portion 22*e* of the intermediate support portion 21 has a greater circumferential length than a portion 22*f* of the intermediate support portion 21. Because of this, uneven contact between both surfaces in the rotation direction of the intermediate support portion 21 and the first and the second coil springs 7 and 8 is controlled. Therefore, the life of the first and the second coil springs 7 and 8 and the intermediate plate 4 is lengthened.

The first and second intermediate restriction portions 22*a* and 22*b* are integrally formed by the ring 20 and the intermediate support portion 21 in order that they extend along the direction of rotation from both sides in the direction of rotation of the intermediate support portion 21. The first and second intermediate restriction portions 22*a* and 22*b* both extend from the end surface of the intermediate support portion 21 in the circumferential direction and are inserted into the first coil spring 7 and the second coil spring 8. The first and second intermediate restriction portions 22*a* and 22*b* both make contact with inner peripheral surface of the first and the second coil springs 7 and 8.

The four intermediate support portions 21 are coupled to each other by means of the ring 20 that functions as an annular coupling member. Thereby restricting movement of each intermediate support portion 21 toward the outer radial direction. As a result, movement of the first and the second coil springs 7 and 8 toward the outer radial direction is restricted by the first and second intermediate restriction portions 22*a* and 22*b*.

Moreover, because the intermediate member 4 is not directly supported on other members, it is difficult for frictional resistance to generate between the other members.

The output member is made of the driven plate 5 and the support clip 6. The driven plate 5 is secured to the turbine shell 53 of the turbine 52 and has the annular portion 5*a* welded to the turbine shell 53 as well as four side portions 5*b*. The side portions 5*b* extend from the annular portion 5*a* to the engine side and are inserted between one group of the first and the second coil springs 7 and 8 and the other first and the second coil springs 7 and 8 adjacent to these. Further, this side portion 5*b* extends into the concave portion 15 of the drive plate 3 and both ends in the direction of rotation make contact with the first spring seat 30 and the second spring seat 31.

The support clip 6 is a disk-shaped annular sheet-metal plate member and is principally made of a cylindrical portion 25 and a disk-shaped portion 26 that extends from the transmission side of the cylindrical portion 25 to the inner peripheral side. A cutout connection portion 27 is formed at four locations at intervals in the direction of rotation on the inner peripheral edge of the disk-shaped portion 26. The side portions 5*b* of the driven plate 5 are inserted inside this cutout connection portion 27 where they connect. Thereby, the support clip 6 rotates together with the driven plate 5. In the portion where the cutout connection portion 27 is formed, one portion of the disk-shaped portion 26 becomes the spring contact portion 28 that is bent toward the transmission side. The spring contact portion 28 makes contact with the first spring seat 30 and the second spring seat 31. The spring contact portion 28 and the side portions 5*b* support different positions in the radial direction of the first and second spring seats 30 and 31 which are attached to the first and the second coil springs 7 and 8. Therefore the support of the ends of the first and the second coil springs 7 and 8 is stable.

Figure 4:
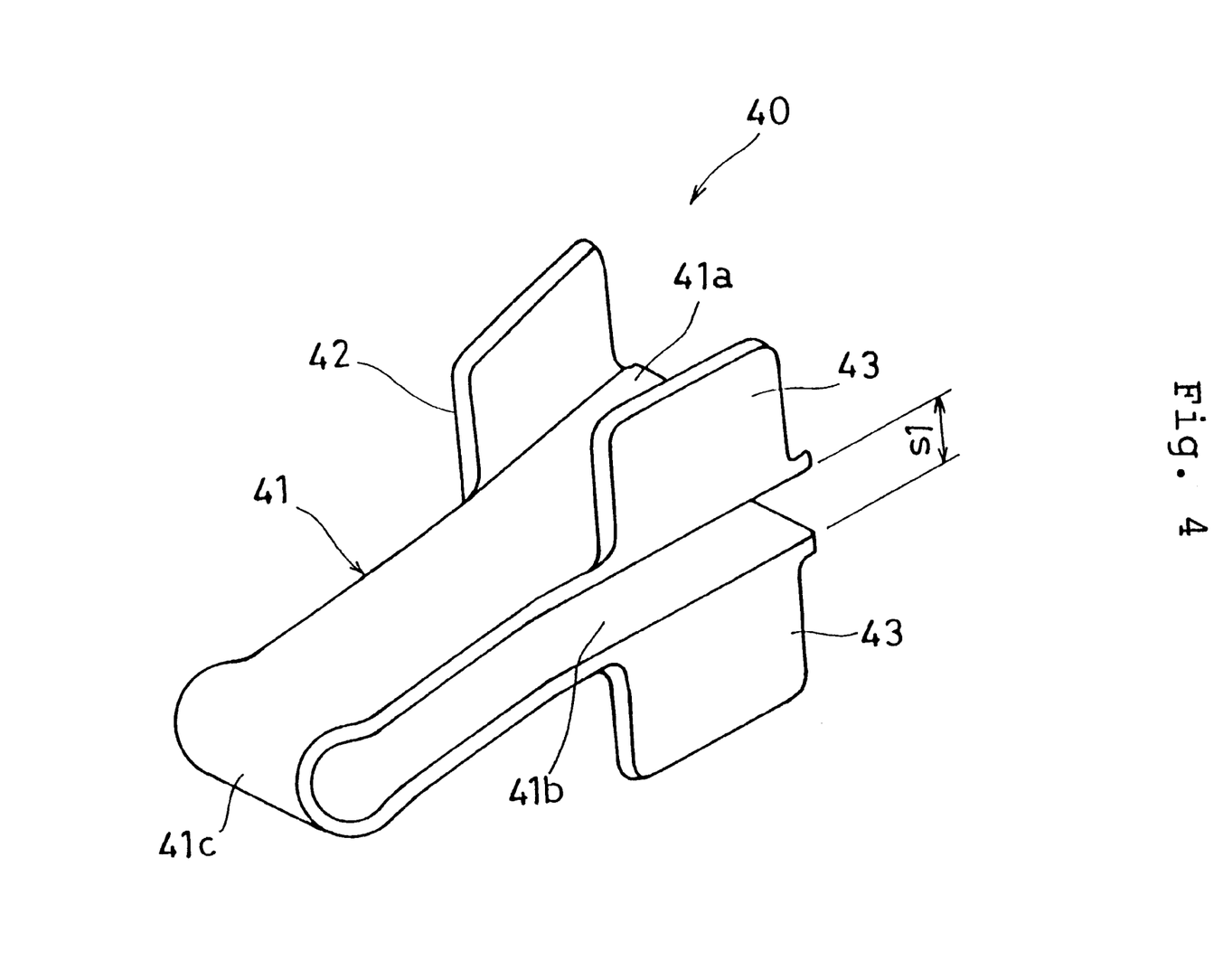
FIG. 4 is a perspective view of the support clip shown removed from the torque converter and the lockup mechanism.
Figure 5:
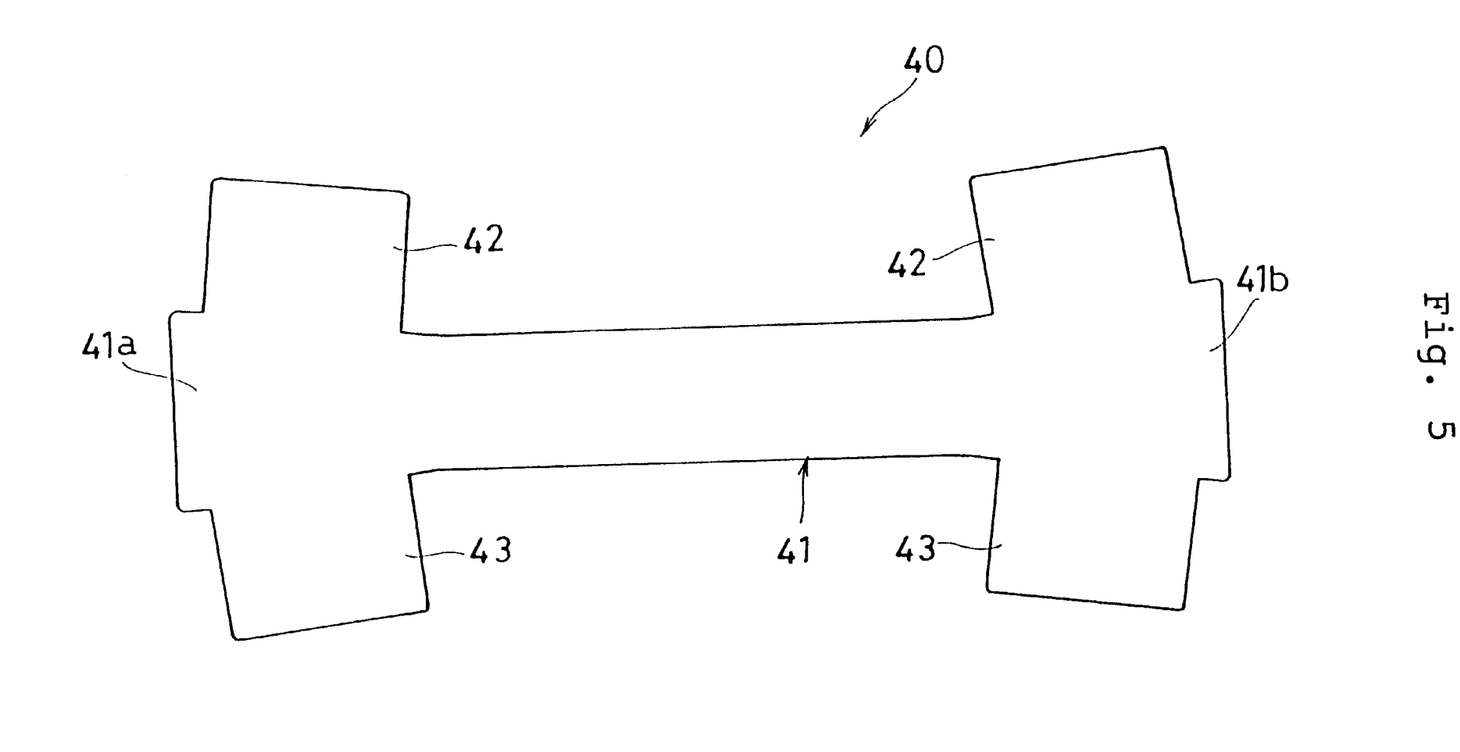
FIG. 5 is an elevation view of basic material cut to form the support clip, but shown in a state prior to being provided with the shape depicted in FIG. 4.

The support clip 40 is attached to the intermediate plate 4 and is made of a pincher portion 41, a first support portion 42 and a second support portion 43. This support clip 40 is produced by a bending process where a plate cut from spring steel initially has the shape shown in FIG. 5 and is then bent or deformed into the shape shown in FIG. 4.

The pincher portion 41 grips the intermediate plate 4 and is made of a first side portion 41*a* that presses against the surface of the intermediate plate 4 on the transmission side, a second side portion 41*b* that presses against the surface of the intermediate plate 4 on the engine side, and a circular arc portion 41*c* (coupler) that joins one end of the first side portion 41*a* and one end of the second side portion 41*b*.

The first side portion 41a and the second side portion 41b make contact with both surfaces of the ring 20 of the intermediate plate 4 and the intermediate support portion 21. The distance (s1) between the first side portion 41a and the second side portion 41b is set to be slightly smaller than the thickness of the intermediate plate 4. When the support clip 40 is attached to the intermediate plate 4, the first side portion 41a and the second side portion 41b press against both surfaces of the ring 20 and the intermediate support portion 21 by means of the elastic biasing force of the curved circular arc portion 41c. Furthermore, the tip portions of the first and second side portions 41a and 41b have a shape that widens to a fan shape corresponding to the triangular shape of the intermediate support portion 21.

The circular arc portion 41c is disposed on the inner peripheral side of the lockup mechanism 1 radially inside the first and second side portions 41a and 41b. Because of this, even if the lockup mechanism 1 rotates and centrifugal force acts on the support clip 40, shifting of the position of the support clip 40 toward the outer radial direction against the intermediate plate 4 is controlled by the circular arc portion 41c on the inner peripheral end of the ring 20 of the intermediate plate 4.

The first support portion 42 is a surface that supports the negative direction of rotation R2 of the first coil spring 7 in the circumferential direction and extends from the tip portions of the first and second side portions 41a and 41b. This first support portion 42 intersects the first and second side portions 41a and 41b at an almost perpendicular angle.

The second support portion 43 is a surface that supports the positive direction of rotation R1 of the second coil spring 8 in the circumferential direction and extends from the tip portions of the first and second side portions 41a and 41b. This second support portion 43 intersects the first and second side portions 41a, 41b at an almost perpendicular angle.

The surface area of the first support portion 42 and the second support portion 43 is large in comparison to the surface area of the end surface of the intermediate support portion 21. One portion of the inner peripheral side and one portion of the outer peripheral side of the ends of the first and the second coil springs 7 and 8 can be supported by means of the end surface of the intermediate support portion 21 only. Hereupon however, in addition to the support the end surface of the intermediate support portion 21, the portion of the ends of the first and the second coil springs 7 and 8 on the engine side and on the transmission side are widely supported by the first support portion 42 and the second support portion 43. Because of this, the support state of the ends of the first and the second coil springs 7 and 8 is stabilized. In other words, the ends of the first and the second coil springs 7 and 8 rotating, bending towards the engine side or the transmission side and then interfering with or sliding on the piston 2 or the support clip 6 is controlled. Therefore, the damper characteristics of the lockup mechanism 1 are stabilized.

Even further, although the support clip 40 is formed from spring steel here, an integrally formed synthetic resin can be used as the material.

Next, the operation is described.

The torque of the crankshaft on the engine side is input to the front cover 50 through a flexible plate (not shown in figure). This torque is transmitted to an impeller (not shown in figure). When the impeller rotates, hydraulic oil flows toward the turbine 52 side causing the turbine 52 to rotate. The torque of the turbine 52 is output to the main drive shaft through the turbine hub (not shown in figure).

If the speed ratio of the torque converter increases and the main drive shaft reaches a fixed rotation speed, the hydraulic oil between the piston 2 and the front cover 50 will be drained through the inside of the main drive shaft. As a result, the piston 2 is pressed against the working surface of the front cover 50 by means of the oil pressure difference. Because of this, the torque of the front cover 50 is transmitted to the turbine 52 through the lockup mechanism 1. In addition, the front cover 50 and the turbine 52 are mechanically coupled and the torque of the front cover 50 is directly output to the main drive shaft without going through the impeller.

In the lockup coupling state, the inner peripheral connection portion 14 of the drive plate, the concave portion 15 and the outer peripheral connection portion 16 press on the first and the second coil springs 7 and 8 (coupled by means of the intermediate plate 4) in the positive direction of rotation R1 and the first coil spring 7 presses on the side portion 5b of the driven plate 5 and the spring contact portion 28. This action transmits torque from the piston 2 to the driven plate 5.

In this lockup coupling state, the lockup mechanism 1 transmits torque as well as absorbing and dampening twisting vibrations input from the front cover 50. In concrete terms, twisting vibrations are absorbed and dampened by means of the first coil spring 7 and the second coil spring 8 contracting and expanding between the drive plate 3 and the driven plate 5.

Hereupon, in order that the first coil spring 7 and the second coil spring 8 operate coupled in series, the angle at which relative rotation between the input rotor and the output rotor can rotate is relatively large, when compared to prior art configurations. Even further, wide twisting angle characteristics are ensured notwithstanding the fact that the first coil spring 7 and the second coil spring 8 are disposed on the outer peripheral portion of the torque converter and the lockup mechanism 1.

According to the present invention, because the ends of the first and the second elastic members 7 and 8 are supported by means of the auxiliary support member 40 in addition to the intermediate support portion 21 of the intermediate member 4, the support state of the first and the second elastic members 7 and 8 is stabilized thereby making it possible to control unexpected deformations in the elastic members which would change the damper properties as well as control excessive stress acting on the elastic members.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A damper assembly for a torque converter, the damper assembly for dampening and absorbing vibrations transferred from an input member to an output member while transmitting torque from the input member to the output member, the damper assembly comprising;

a plurality of pairs of first and second elastic members disposed in series between the input member and the output member, an intermediate member formed with an annular ring portion and a plurality of intermediate support portions that extend in a radially outward direction from said annular ring portion, each of said intermediate support portions having first and second circumferential side edges that extend between one of said pairs of first and second elastic members contacting and supporting corresponding ends of said first and second elastic members, respectively, in the circumferential direction, and a plurality of auxiliary support members, each auxiliary support member being formed with a pincher portion that engages opposing sides of said intermediate support portion, each of said auxiliary support members having a first support portion that extends in a direction generally perpendicular to and away from said first side edge of said intermediate support portion, said first support portion engaging a corresponding circumferential end of one of said first elastic member in the circumferential direction, and a second support portion that extends in a direction generally perpendicular to and away from said second side edge of said intermediate support portion, said second support portion engaging and supporting a corresponding circumferential end of one of said second elastic member in the circumferential direction.

2. The damper assembly as set forth in claim 1 wherein the pincher portion of said auxiliary support member is formed from spring steel.

3. The damper assembly as set forth in claim 1 wherein the pincher portion of said auxiliary support member is formed of a synthetic resin.

4. The damper assembly as set forth in claim 1 wherein said auxiliary support member is formed with a first side portion engaged with one surface of said intermediate member, a second side portion engaged with an opposite surface of said intermediate member, and a curved coupling portion that joins one end of said first side portion to one end of said second side portion.

5. A damper assembly for a torque converter, the damper assembly for dampening and absorbing vibrations transferred from an input member to an output member while transmitting torque from the input member to the output member, the damper assembly comprising;

a first elastic member and a second elastic member disposed in series between the input member and the output member, a plate-shaped intermediate member formed with an annular coupling portion, and a plate-shaped intermediate support portion formed on an outer radial portion of said annular coupling portion, said intermediate support portion having first and second side edges that contact and support corresponding ends of said first and second elastic members, respectively, in the circumferential direction, and an auxiliary support member formed with a first side portion engaged with one surface of said intermediate member, a second side portion engaged with an opposite surface of said intermediate member, and a curved coupling portion that joins one end of said first side portion to one end of said second side portion, said auxiliary support member being disposed about a portion of said intermediate member such that said curved coupling portion is located radially inward from said intermediate support portion, said auxiliary support member having a first support portion that extends in a direction generally perpendicular to said first side edge of said intermediate support portion, said first support portion extending from and perpendicular to said first side portion, said first support portion engaging a corresponding circumferential end of said first elastic member in the circumferential direction, said auxiliary support member also including a second support portion extending from and perpendicular to said second side portion, said second support portion extending in a direction generally perpendicular to said second side edge of said intermediate support portion, said second support portion engaging and supporting a corresponding circumferential end of said second elastic member in the circumferential direction.

6. The damper assembly as set forth in claim 5 further comprising:

a plurality of said first and second elastic members; and a corresponding plurality of said intermediate support portions disposed between said circumferential ends of said first and second elastic members, said intermediate support portions being formed on a radially outer periphery of said annular coupling portion.

7. The damper assembly as set forth in claim 5 wherein said auxiliary support member is formed from spring steel.

8. The damper assembly as set forth in claim 5 wherein said auxiliary support member is formed of a synthetic resin.

* * * * *